(12) United States Patent
Wright et al.

(10) Patent No.: US 8,482,173 B2
(45) Date of Patent: Jul. 9, 2013

(54) END SHIELD AND INNER BEARING CAP ASSEMBLY

(75) Inventors: Scott Wright, Wausau, WI (US); Christopher T. Ohrmundt, Wausau, WI (US); Wesley K. Anderson, Cedarburg, WI (US)

(73) Assignee: Regal Beloit America, Inc., Beloit, WI (US)

( * ) Notice: Subject to any disclaimer, the term of this patent is extended or adjusted under 35 U.S.C. 154(b) by 319 days.

(21) Appl. No.: 12/353,833

(22) Filed: Jan. 14, 2009

(65) Prior Publication Data

US 2010/0176673 A1  Jul. 15, 2010

(51) Int. Cl.
*H02K 5/10* (2006.01)
*H02K 5/12* (2006.01)

(52) U.S. Cl.
USPC ............... 310/88; 310/89; 310/90; 310/91; 310/400

(58) Field of Classification Search
CPC .......... H02K 9/24; H02K 2205/09; H02K 5/10
USPC .......... 310/88, 89, 90, 91, 400–417, 216.114
See application file for complete search history.

(56) References Cited

U.S. PATENT DOCUMENTS

| | | | | |
|---|---|---|---|---|
| 5,591,019 A | * | 1/1997 | Brown | 417/422 |
| 5,752,812 A | * | 5/1998 | Brown | 417/422 |
| 5,753,986 A | | 5/1998 | Ohtani | |
| 6,091,173 A | * | 7/2000 | Byrd | 310/85 |
| 6,093,988 A | * | 7/2000 | Okawa et al. | 310/85 |
| 6,133,661 A | * | 10/2000 | Okawa et al. | 310/90 |
| 6,172,436 B1 | * | 1/2001 | Subler et al. | 310/90 |
| 6,392,322 B1 | * | 5/2002 | Mares et al. | 310/88 |
| 6,882,924 B2 | * | 4/2005 | Miller | 701/100 |
| 7,069,137 B2 | * | 6/2006 | Miller | 701/100 |
| 7,091,640 B2 | | 8/2006 | Borcherding et al. | |
| 2007/0159017 A1 | * | 7/2007 | Martin et al. | 310/88 |
| 2007/0159018 A1 | * | 7/2007 | Martin et al. | 310/88 |
| 2010/0176673 A1 | * | 7/2010 | Wright et al. | 310/88 |

OTHER PUBLICATIONS

"Selecting Explosion-Proof Motors and Variable-Frequency Drive Controllers for Hazardous Environmental Applications", Reliance Electric Company, Sep. 2000.*
Underwriters Laboratories Standard 674, Bolts in Joint Width, Dec. 11, 2003, 1 page.
National Electrical Code, "Chapter 1, Article 100—Definitions", pp. 70-26-70-34, 9 pages.
Underwriters Laboratories Inc. for Safety, UL 674 "Electric Motors and Generators for Use in Hazardous (Classified) Locations," Aug. 12, 2011, 106 pages.

* cited by examiner

*Primary Examiner* — John K Kim
(74) *Attorney, Agent, or Firm* — Armstrong Teasdale LLP

(57) ABSTRACT

An explosion proof motor including a stationary assembly and a rotatable assembly is described. The stationary assembly includes a stator that defines a stator bore. The rotatable assembly includes a rotor and a rotor shaft extending substantially axially through the stator bore. The explosion proof motor includes a frame configured to at least partially surround the stator. The frame defines an interior and an exterior of the motor. The explosion proof motor also includes at least one end shield positioned at an end of the frame and a bearing cap positioned proximate to the interior side of the end shield. The explosion proof motor also includes a flame path gap defined between the end shield and the bearing cap. The flame path gap includes at least one section that extends substantially parallel to the rotor shaft.

16 Claims, 10 Drawing Sheets

END SHIELD AND INNER BEARING CAP ASSEMBLY

BACKGROUND OF THE INVENTION

The field of the invention relates generally to electric motors, and more specifically, to an end-shield and inner bearing cap assembly for use in an explosion proof electric motor.

The National Fire Protection Association (NFPA) publishes codes and standards, with the mission to minimize the possibility and effects of fire and other events. One NFPA standard is Standard No. 70, the National Electrical Code. Article 100 of Standard No. 70 includes a general definition of an explosion proof apparatus. Article 100 defines an explosion proof apparatus as, an "[a]pparatus enclosed in a case that is capable of withstanding an explosion of a specific gas or vapor that may occur within it and of preventing the ignition of a specified gas or vapor surrounding the enclosure by sparks, flashes, or explosion of the gas or vapor within, and that operates at such an external temperature that a surrounding flammable atmosphere will not be ignited thereby." The explosion proof designation does not ensure that an apparatus is incapable of exploding, but rather that the apparatus is capable of withstanding an explosion without causing damage to the apparatus' surroundings beyond a certain level.

Flame paths positioned between a motor end shield and an inner bearing cap are known to minimize external damage in the event of an electric motor explosion. Another safety organization, Underwriters Laboratories (UL), publishes minimum requirements that must be met before receiving a UL rating. One minimum requirement established by UL for explosion proof motors is a minimum length of a flame path defined between a motor end shield and an internal bearing cap. Meeting/exceeding the minimum flame path length may prevent motor size reduction and/or limit the sizes of bearings that may be included in a motor.

BRIEF DESCRIPTION OF THE INVENTION

In one aspect, an explosion proof motor including a stationary assembly and a rotatable assembly is provided. The stationary assembly includes a stator that defines a stator bore. The rotatable assembly includes a rotor and a rotor shaft extending substantially axially through the stator bore. The explosion proof motor includes a frame configured to at least partially surround the stator. The frame defines an interior and an exterior of the motor. The explosion proof motor also includes at least one end shield positioned at an end of the frame and a bearing cap positioned proximate to the interior side of the end shield. The explosion proof motor also includes a flame path gap defined between the end shield and the bearing cap. The flame path gap includes at least one section that extends substantially parallel to said rotor shaft.

In another aspect, a method for assembling an explosion proof motor is provided. The explosion proof motor includes a rotor and a rotor shaft positioned at least partially within an interior of a stator bore. The rotor shaft extends axially through the stator bore. The method includes positioning a bearing cap around the rotor shaft and positioning a bearing around the rotor shaft and proximate to the bearing cap. The method also includes positioning an end shield proximate to the bearing and the bearing cap, wherein a flame path gap is defined between the bearing cap and the end shield. The flame path gap includes at least one section that extends substantially parallel to the rotor shaft.

In yet another aspect, an end shield and inner bearing cap assembly for an explosion proof motor is provided. The assembly includes an end shield and an inner bearing cap. The inner bearing cap is positioned proximate to the end shield. The end shield and the bearing cap include shaft openings extending substantially axially therethrough. The assembly also includes a flame path gap defined between the end shield and the bearing cap. The flame path gap includes at least one section that extends substantially parallel to said axial shaft openings.

DETAILED DESCRIPTION OF THE INVENTION

Figure 1:
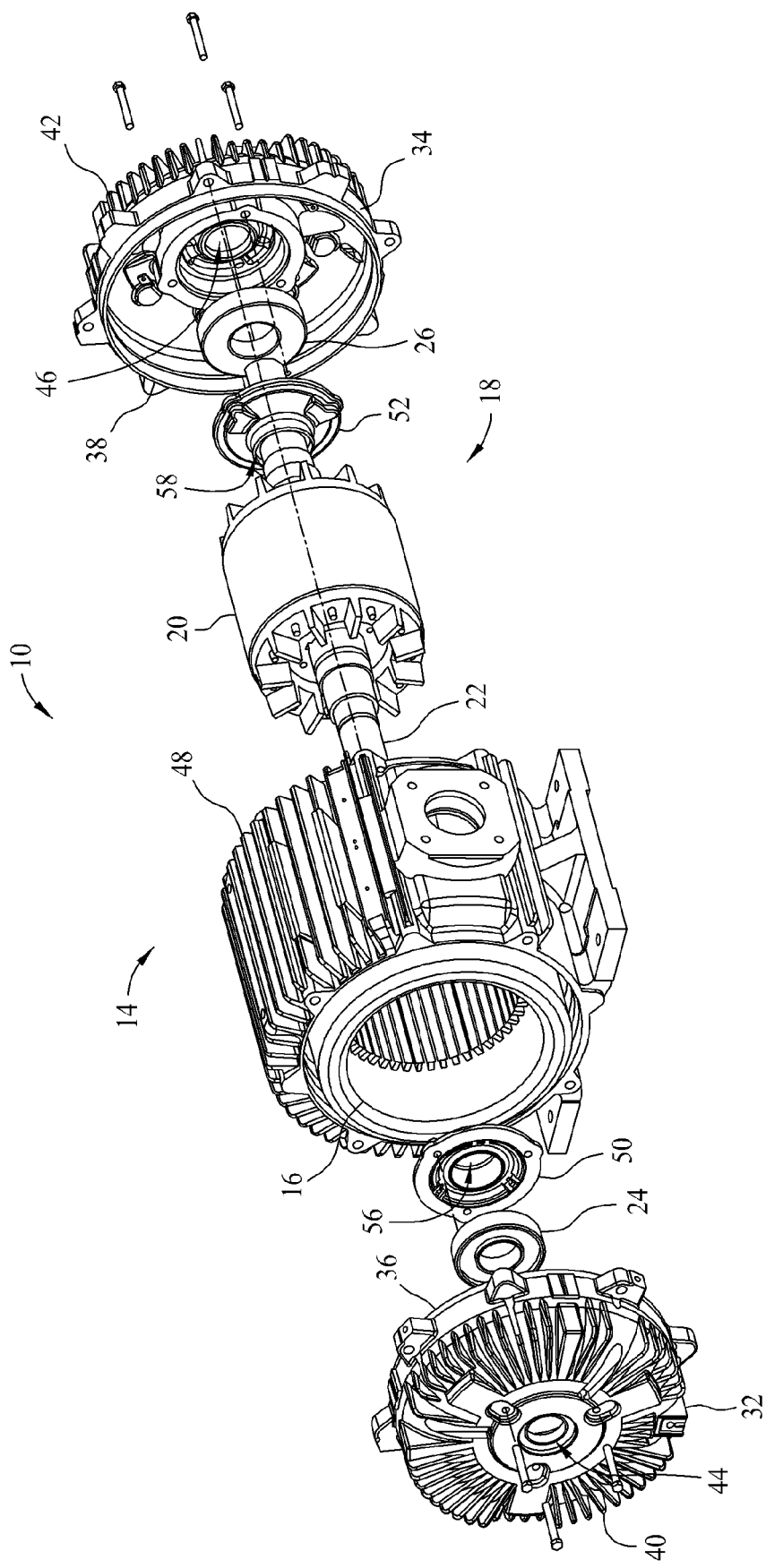
FIG. 1 is an exploded view of an electric motor assembly.

FIG. 1 is an exploded view of an electric motor assembly 10. Electric motor assembly 10 includes a stationary assembly 14 that includes a stator or core 16. Electric motor assembly 10 also includes a rotatable assembly 18 that includes a rotor 20 and a shaft 22. A fan (not shown) or other means to be driven such as means for moving air through an air handling system engages shaft 22. Specifically, motor assembly 10 is for use in applications where hazardous fumes or dust may be present.

Rotor 20 is mounted on shaft 22 journaled for rotation in bearings 24 and 26. End shields 32 and 34 are substantially parallel to each other. End shields 32 and 34 have inner facing sides 36 and 38 between which stationary assembly 14 and rotatable assembly 18 are located. Each end shield 32 and 34 has an outer side 40 and 42 opposite its inner side 36 and 38. Additionally, first end shield 32 has an aperture 44 for shaft 22 to pass through and extend out from outer side 40. Second end shield 34 has an aperture 46 for the shaft 22 to pass through and extend out from the outer side 42. End shields 32 and 34 are coupled to a motor housing 48 that surrounds stationary assembly 14 and rotatable assembly 18.

Electric motor assembly 10 also includes inner bearing caps 50 and 52. Inner bearing caps 50 and 52 include openings 56 and 58 through which shaft 22 passes through. Inner bearing caps 50 and 52 are configured to be coupled to first end shield 32 and second end shield 34, respectively. Bearing 26 is secured between first end shield 32 and inner bearing cap 50. Bearing 24 is secured between second end shield 34 and inner bearing cap 52.

Figure 2:
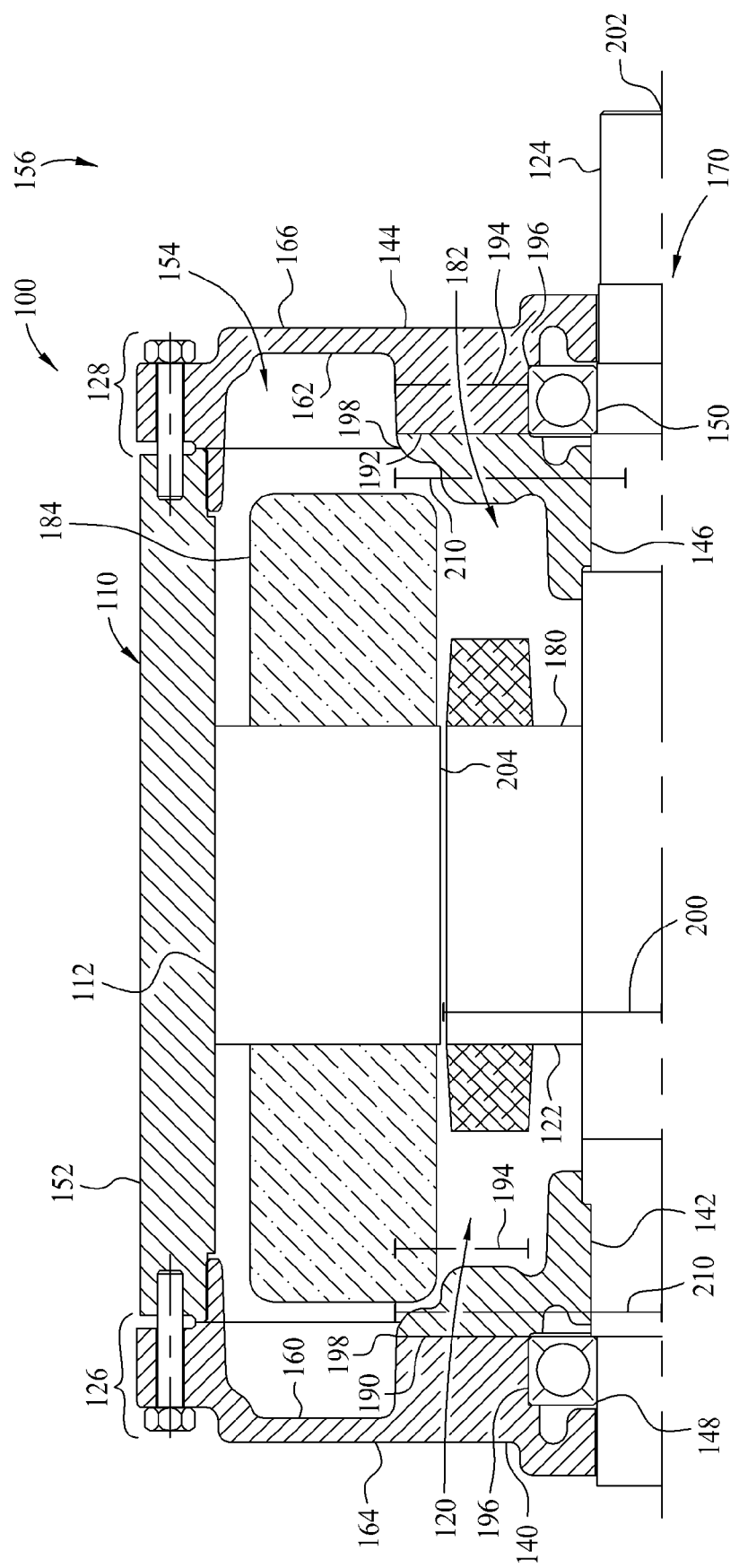
FIG. 2 is a partial cross-sectional view of an upper half of a known electric motor.

FIG. 2 is a partial cross-sectional view of an upper half of a known electric motor 100. Electric motor 100 includes a stationary assembly 110 including a stator core 112 and a rotatable assembly 120. Rotatable assembly 120 includes a rotor 122 and a shaft 124. Electric motor 100 also includes end shield and inner bearing cap assemblies 126 and 128. End shield and inner bearing cap assembly 126 includes an end shield 140 and an inner bearing cap 142. End shield and inner bearing cap assembly 128 includes an end shield 144 and an inner bearing cap 146.

Rotor 122 is mounted on and secured to shaft 124 journaled for rotation in bearings 148 and 150. Bearing 148 is positioned between end shield 140 and inner bearing cap 142. Similarly, bearing 150 is positioned between end shield 144 and inner bearing cap 146. End shields 140 and 144 are substantially parallel to each other and coupled to a motor frame 152 to define an interior 154 and an exterior 156 of motor 100. End shields 140 and 144 have inner facing sides 160 and 162 between which stationary assembly 110 and rotatable assembly 120 are located. Each end shield 140 and 144 has an outer side 164 and 166 opposite its inner side 160 and 162. Additionally, end shield 144 includes an aperture 170 for shaft 124 to pass through and extend out from outer side 166. Although described herein as end shields 140 and 144, end shields 140 and 144 may also be referred to as end members and/or end caps. Rotor 122 includes a core 180 and is rotatable within a bore 182 of stator 112. Stationary assembly 110 includes a plurality of winding stages 184 adapted to be electrically energized to generate an electromagnetic field.

Electric motor 100 also includes a first flame path gap 190 and a second flame path gap 192. First flame path gap 190 is defined as an interface between end shield 140 and inner bearing cap 142. Second flame path gap 192 is defined as an interface between end shield 144 and inner bearing cap 146. Flame path gaps 190 and 192 each have a length 194, measured from an outer edge 196 of bearing 148 and 150 to an outer edge 198 of inner bearing caps 142 and 146. Certain applications for motor 100 require length 194 meet or exceed a defined value in order to receive an organization provided label. For example, Underwriters Laboratories (UL), publishes minimum requirements that must be met before receiving a UL rating. In order to obtain the UL designation as an "explosion proof" motor, the motor may be required to include a flame path gap exceeding a minimum length.

Stator bore 182 has an inner radius 200, measured from a center 202 of shaft 124 to an inner edge 204 of stator 112. Inner bearing caps 142 and 146 have an outer radius 210, measured from center 202 of shaft 124 to outer edge 198 of inner bearing caps 142 and 146. Assembly techniques that include passing inner bearing cap 142 or inner bearing cap 146 through stator bore 182 are not possible because radius 210 is greater than radius 200. In order to maintain flame path gap length 194, while reducing radius 210 of inner bearing cap 142, a smaller bearing 148 may be selected. In typical motor assembly processes, only one of inner bearing caps 142 and 146 is passed through stator bore 182. A larger bearing provides benefits such as, but not limited to, increasing bearing life and reducing vibration. However, in known motors, to facilitate passing one of inner bearing caps 142 and 146 through stator bore 182 during assembly, a smaller bearing is included on one side of motor 100.

Figure 3:
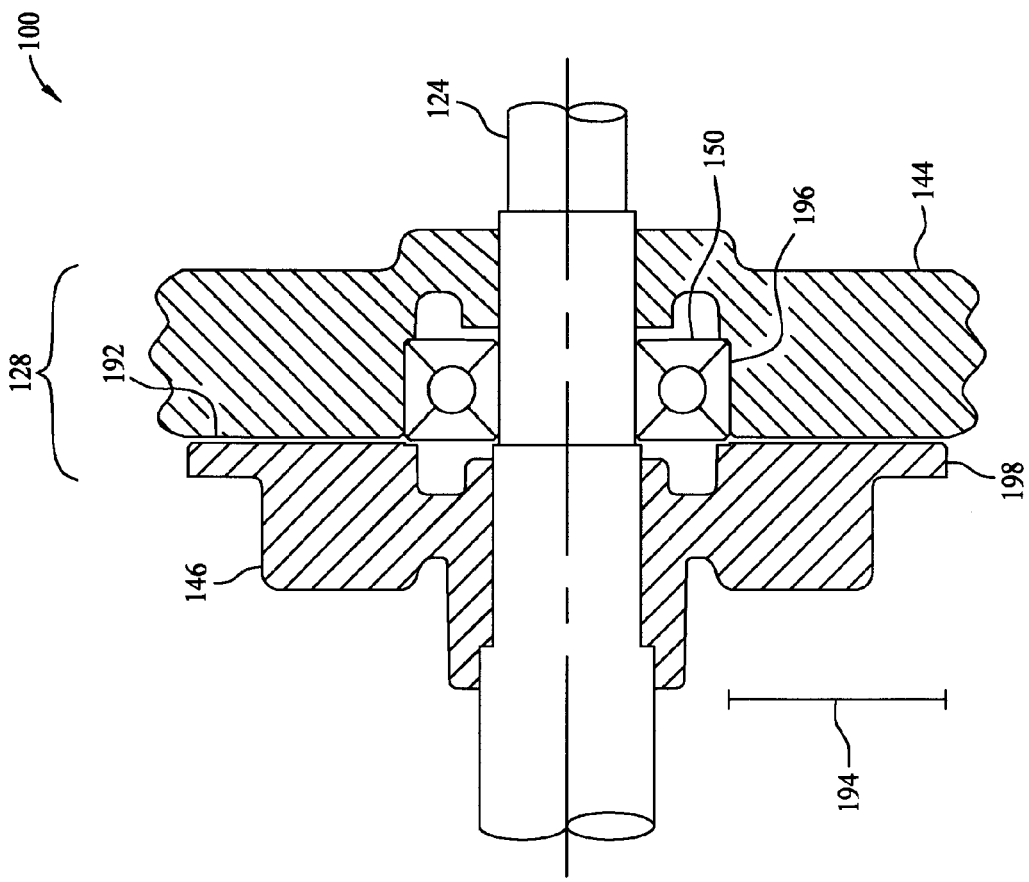
FIG. 3 is an expanded view of a portion of the electric motor shown in FIG. 1.

FIG. 3 is an expanded view of a portion of electric motor 100 (shown in FIG. 2). More specifically, FIG. 3 is an expanded view of a portion of end shield and inner bearing cap assembly 128, shaft 124, and bearing 150. Flame path gap 192 is defined between end shield 144 and inner bearing cap 146. Flame path gap 192 is substantially radially aligned with respect to shaft 124 and has length 194 extending from outer edge 196 of bearing 150 to outer edge 198 of inner bearing cap 146. End shield and inner bearing cap assembly 126, and therefore flame path gap 190 (shown in FIG. 2), are configured in a substantially similar manner to end shield and inner bearing cap assembly 128 and flame path gap 192, on an opposite side of motor 100.

Figure 4:
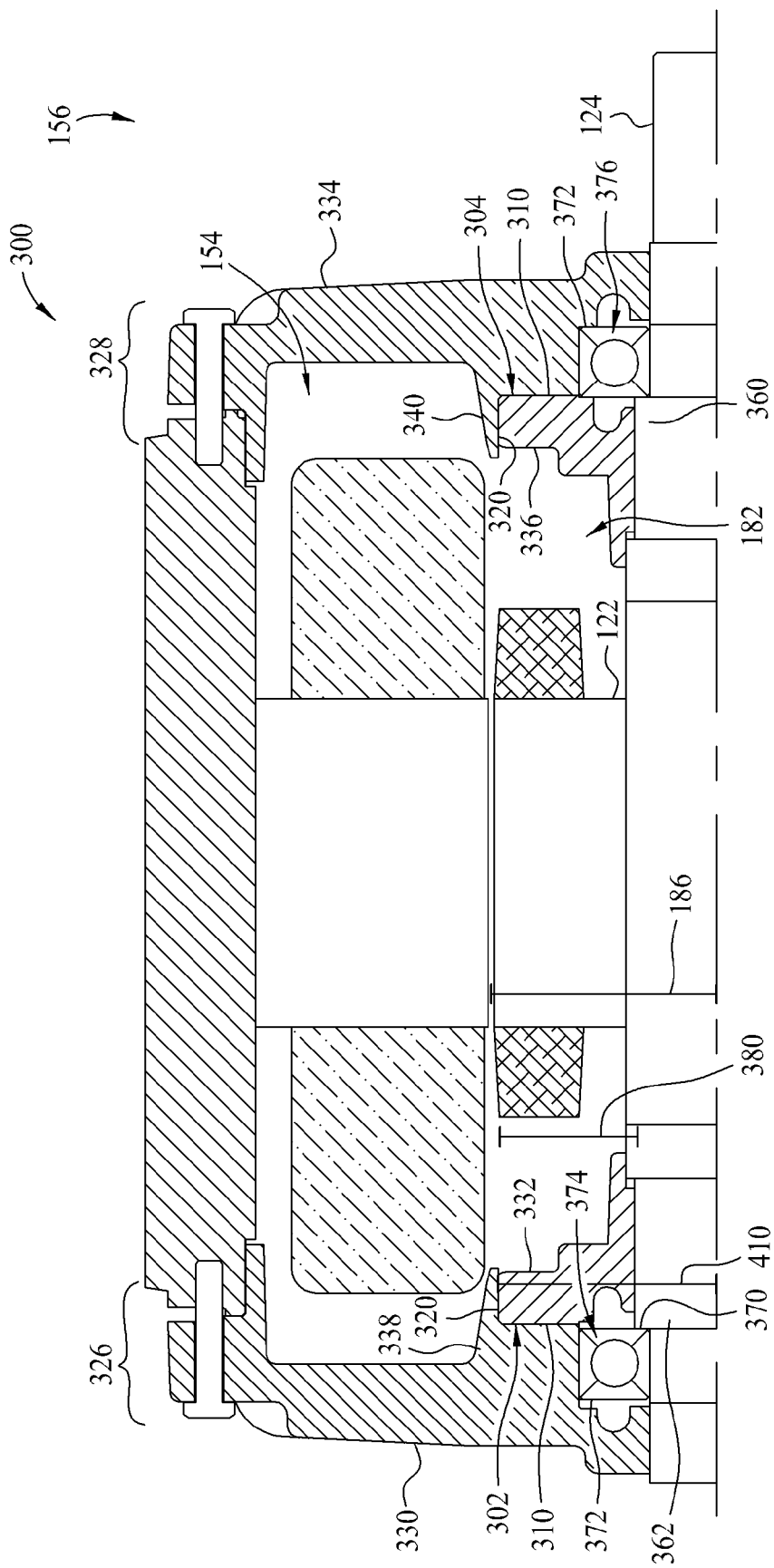
FIG. 4 is a partial cross-sectional view of an upper half of an electric motor that includes an exemplary end shield and inner bearing cap assembly.

FIG. 4 is a partial cross-sectional view of an upper half of an exemplary embodiment of an electric motor 300 that includes a first flame path gap 302 and second flame path gap 304, each having a substantially radial section 310 and a substantially axial section 320. Components shared between electric motor 300 and electric motor 100 (shown in FIG. 2) are identified with the same reference numerals. In the exemplary embodiment, electric motor 300 includes end shield and inner bearing cap assemblies 326 and 328. In the exemplary embodiment, end shield and inner bearing cap assembly 326 includes a first end shield 330 and an inner bearing cap assembly 332. In the exemplary embodiment, end shield and inner bearing cap assembly 328 includes a second end shield 334 and an inner bearing cap 336. First end shield 330 includes a flame path tab 338 and second end shield 334 includes a flame path tab 340. Flame path tabs 338 and 340 are axial protrusions extending from end shields 330 and 334 toward stator bore 182. In the exemplary embodiment, inner bearing cap 332 is positioned around shaft 124 and extends toward flame path tab 338. Inner bearing cap 336 is positioned around shaft 124 and extends toward flame path tab 340. Shaft 124 extends through openings 360 and 362 in inner bearing caps 332 and 336. Bearings 370 and 372 are secured between inner bearing caps 332 and 336 and end shields 330 and 334, respectively. More specifically, bearings 370 and 372 are secured within bearing pockets 374 and 376. Bearing pocket 374 is defined by end shield 330, inner bearing cap 332, and shaft 124. Bearing pocket 376 is defined by end shield 334, inner bearing cap 336, and shaft 124.

Figure 5:
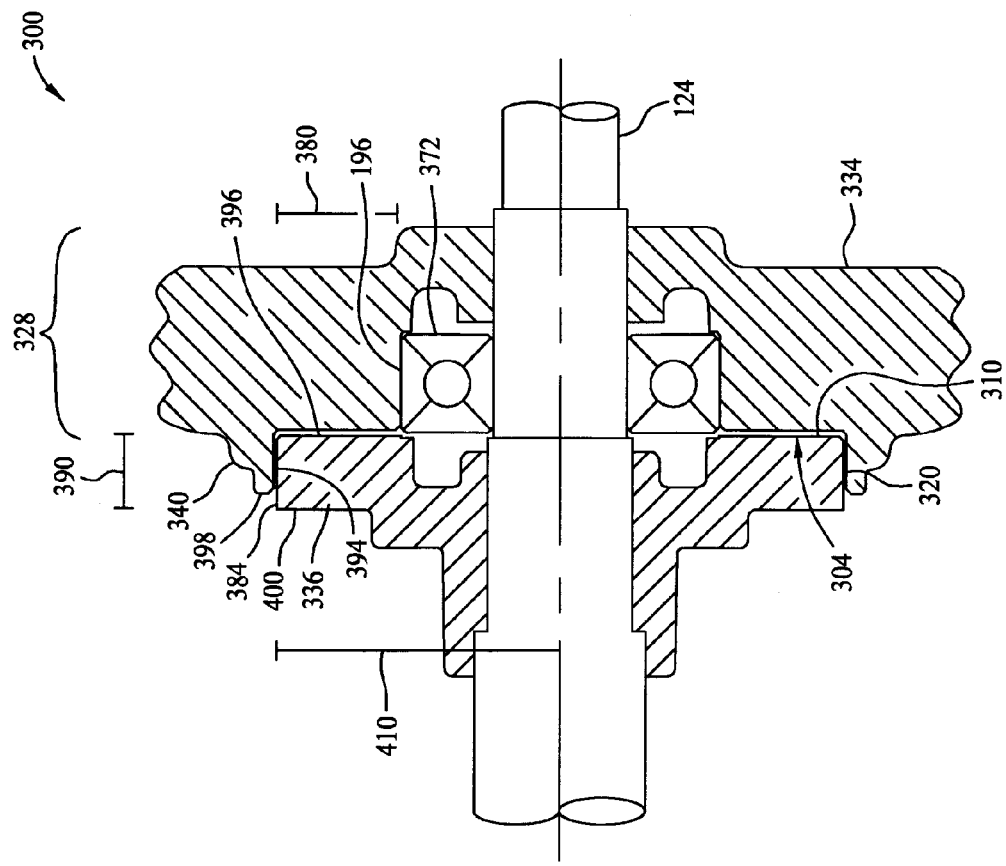
FIG. 5 is an expanded view of a portion of the electric motor shown in FIG. 4 illustrating flame paths therein.

FIG. 5 is an expanded view of a portion of electric motor 300 shown in FIG. 4. More specifically, FIG. 5 is an expanded view of end shield and inner bearing cap assembly 328, shaft 124, and bearing 372. In the exemplary embodiment, flame path gap 304 is defined between end shield 334 and inner bearing cap 336. As described above, flame path gap 304 includes radial section 310 and axial section 320. Radial section 310 extends substantially radially from shaft 124 and has a radial length 380. Radial length 380 is measured from outer surface 196 of bearing 372 to an outer edge 384 of inner bearing cap 336. Axial section 320 extends substantially axially with respect to shaft 124 and has an axial length 390. Radial section 310 extends substantially perpendicular to shaft 124 and axial section 320 extends substantially parallel to shaft 124. More specifically, axial section 320 is defined between a shaft-side edge 394 of flame path tab 340 and outer edge 384 of inner bearing cap 336. Axial length 390 is measured from an inner edge 396 of end shield 334 and either an inner edge 398 of flame path tab 336 or an inner edge 400 of inner bearing end cap 336, whichever is closer to inner edge 396 of end shield 334.

In the exemplary embodiment, axial length 390 is less than radial length 380. A total length of flame path gap 304 is radial length 380 in addition to axial length 390. In the exemplary embodiment, the total length of flame path gap 304 is equal to or greater than length 194 of flame path gap 192 (shown in FIG. 3). However, by including radial section 310 and axial section 320, inner bearing cap 336 has a radius 410 that is smaller than radius 210 (shown in FIG. 2) of inner bearing cap 146 (shown in FIG. 2), while maintaining a flame path gap length. In the exemplary embodiment, end shield and inner bearing cap assembly 326 (shown in FIG. 4) is configured substantially similarly to end shield and inner bearing cap assembly 328.

Referring once again to FIG. 4, radius 410 of inner bearing caps 332 and 336 is smaller than radius 186 of stator bore 182. Radius 410 facilitates assembly processes that include passing inner bearing cap 332 or inner bearing cap 336 through stator bore 182, while maintaining a total length of flame path gap 302 and/or 304.

Figure 6:
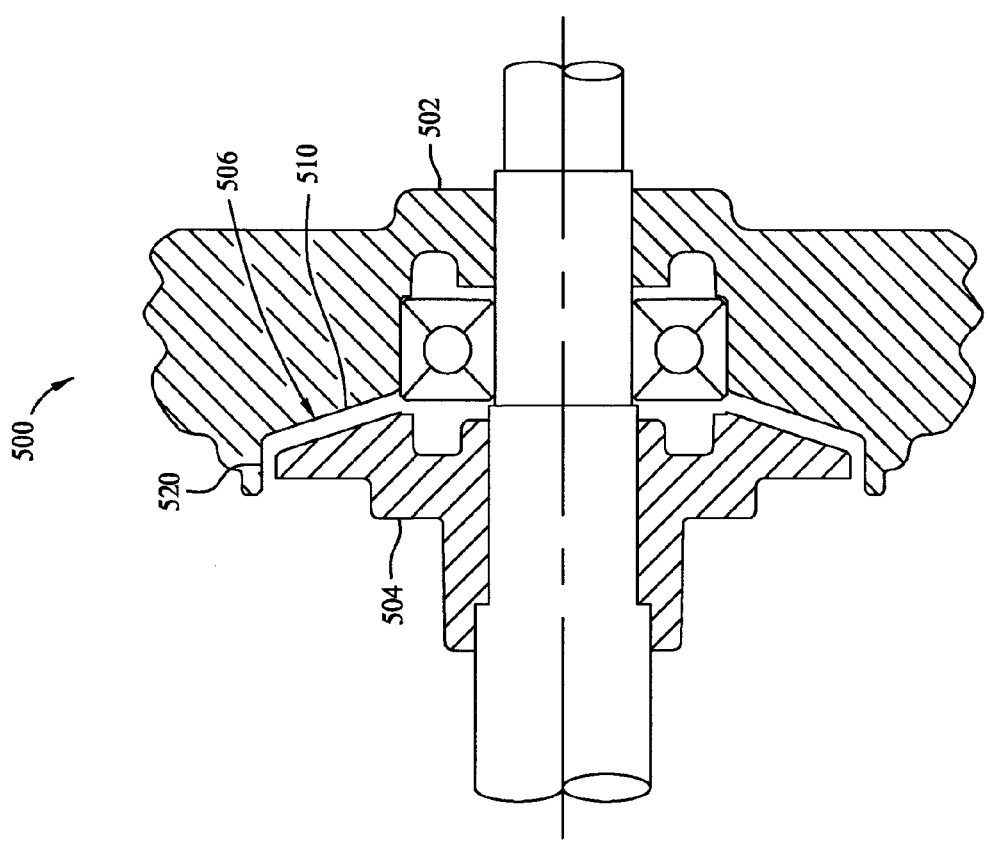
FIG. 6 is a partial cross-sectional view of an alternative embodiment of the end shield and inner bearing cap assembly shown in FIG. 5.

FIG. 6 is a partial cross-sectional view of an alternative embodiment 500 of end shield and inner bearing cap assembly 328 (shown in FIG. 5). Like end shield and inner bearing cap assembly 328, end shield and inner bearing cap assembly 500 may be included in electric motor 300 (shown in FIG. 4). End shield and inner bearing cap assembly 500 includes an end shield 502 and an inner bearing cap 504. A flame path gap 506 is defined between end shield 502 and inner bearing cap 504. In the exemplary embodiment, flame path gap 506 includes a substantially radial section 510 and a substantially axial section 520. Although substantially radial section 510 is illustrated as being angled toward interior 154 (shown in FIG. 4) of electric motor 300, substantially radial section 510 may also be angled toward exterior 156 (shown in FIG. 4) of electric motor 300.

Figure 7:
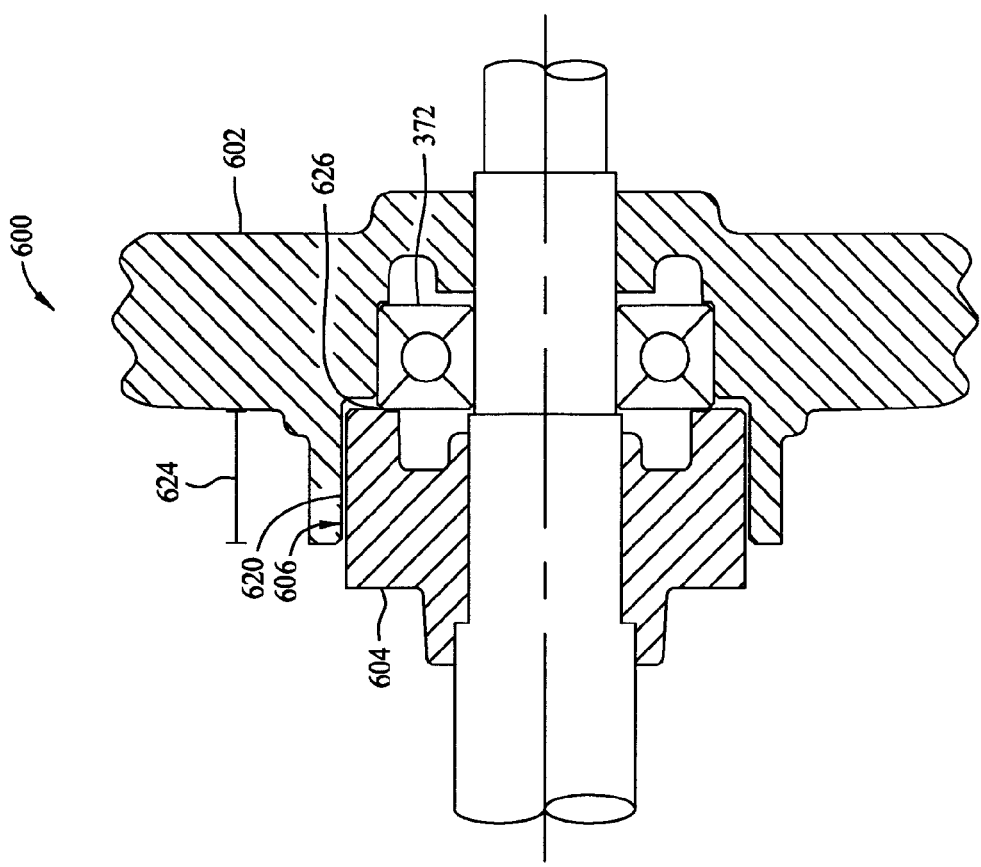
FIG. 7 is a partial cross-sectional view of another alternative embodiment of the end shield and inner bearing cap assembly shown in FIG. 5.

FIG. 7 is a partial cross-sectional view of another alternative embodiment 600 of end shield and inner bearing cap assembly 328 (shown in FIG. 5). Like end shield and inner bearing cap assemblies 328 and 500, end shield and inner bearing cap assembly 600 may be included in electric motor 300 (shown in FIG. 4). End shield and inner bearing cap assembly 600 includes an end shield 602 and an inner bearing cap 604. A flame path gap 606 is defined between end shield 602 and inner bearing cap 604. In the exemplary embodiment, flame path gap 606 includes only a substantially axial section 620. In the exemplary embodiment, axial section 620 has a length 624. Inner bearing cap 604 may be clamped tightly, also referred to as "locked," to an outer race 626 of bearing 372. In the exemplary embodiment, inner bearing cap 604 is positioned directly adjacent to bearing 372 (i.e., no space between inner bearing cap 604 and bearing 372). Eliminating a radial flame path gap section facilitates locking inner bearing cap 604 to bearing 372 while maintaining a flame path gap. It is not possible on explosion proof motor designs that include a radial flame path gap to lock the bearing cap to the bearing, since in order to maintain a radial flame path gap, the bearing cap must be clamped tightly to the end shield.

Figure 8:
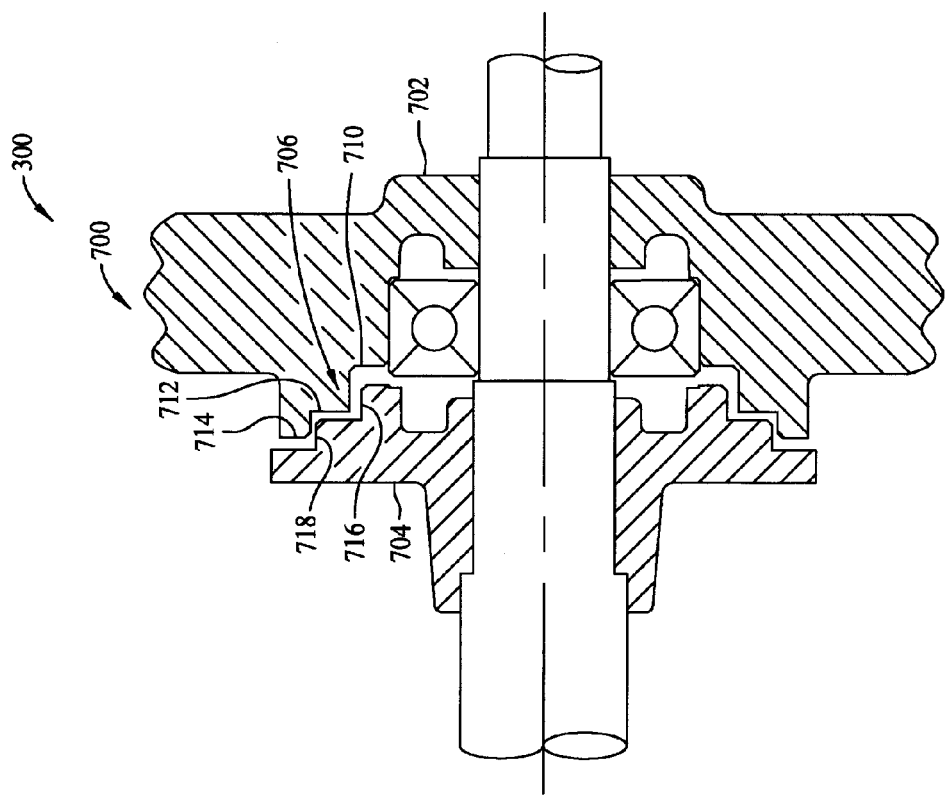
FIG. 8 is a partial cross-sectional view of yet another alternative embodiment of the end shield and inner bearing cap assembly shown in FIG. 5.

FIG. 8 is a partial cross-sectional view of yet another alternative embodiment 700 of end shield and inner bearing cap assembly 328 (shown in FIG. 5). Like end shield and inner bearing cap assemblies 328, 500, and 600, end shield and inner bearing cap assembly 700 may be included in electric motor 300 (shown in FIG. 4). End shield and inner bearing cap assembly 700 includes an end shield 702 and an inner bearing cap 704. A flame path gap 706 is defined between end shield 702 and inner bearing cap 704. In the exemplary embodiment, flame path gap 706 includes a plurality of substantially radial sections 710, 712, and 714 and a plurality of substantially axial sections 716 and 718. In the exemplary embodiment, flame path gap 700 is a step shaped gap defined between end shield 702 and inner bearing cap 704.

Figure 9:
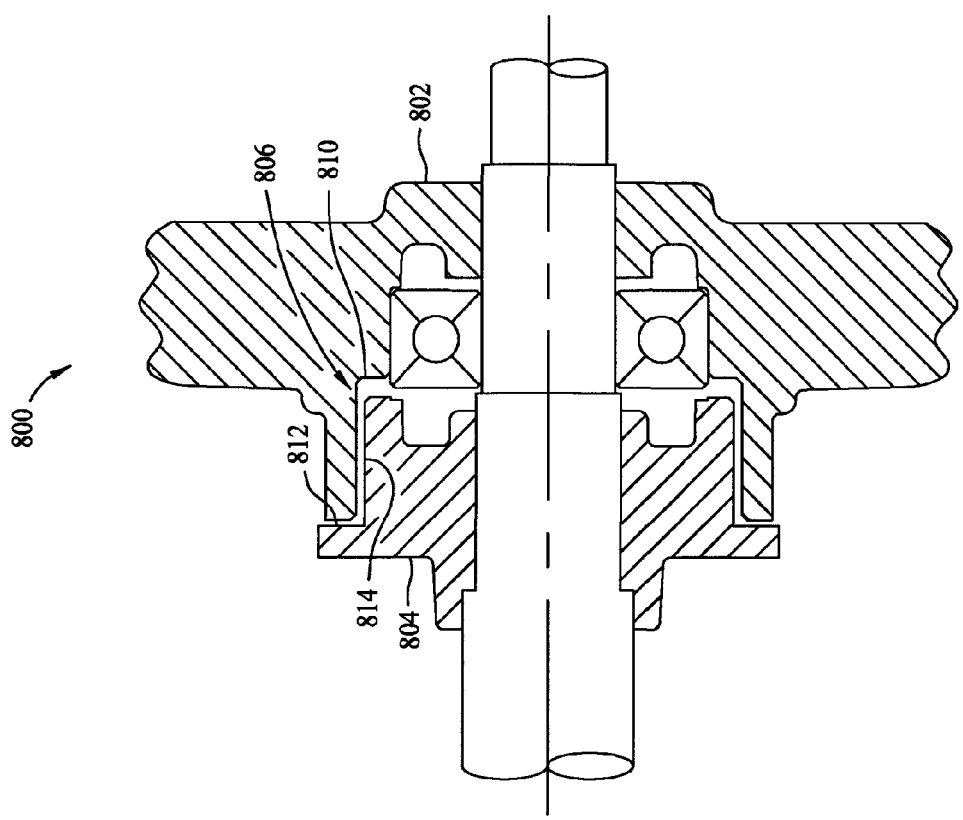
FIG. 9 is a partial cross-sectional view of another alternative embodiment of the end shield and inner bearing cap assembly shown in FIG. 5.

FIG. 9 is a partial cross-sectional view of another alternative embodiment 800 of end shield and inner bearing cap assembly 328 (shown in FIG. 5). Like end shield and inner bearing cap assemblies 328, 500, 600, and 700, end shield and inner bearing cap assembly 800 may be included in electric motor 300 (shown in FIG. 4). In the exemplary embodiment, end shield and inner bearing cap assembly 800 includes an end shield 802 and an inner bearing cap 804. A flame path gap 806 is defined between end shield 802 and inner bearing cap 804. In the exemplary embodiment, flame path gap 806 includes a plurality of substantially radial sections 810 and 812 and a single substantially axial section 814. In the exemplary embodiment, flame path gap 806 is a step shaped gap defined between end shield 802 and inner bearing cap 804.

Figure 10:
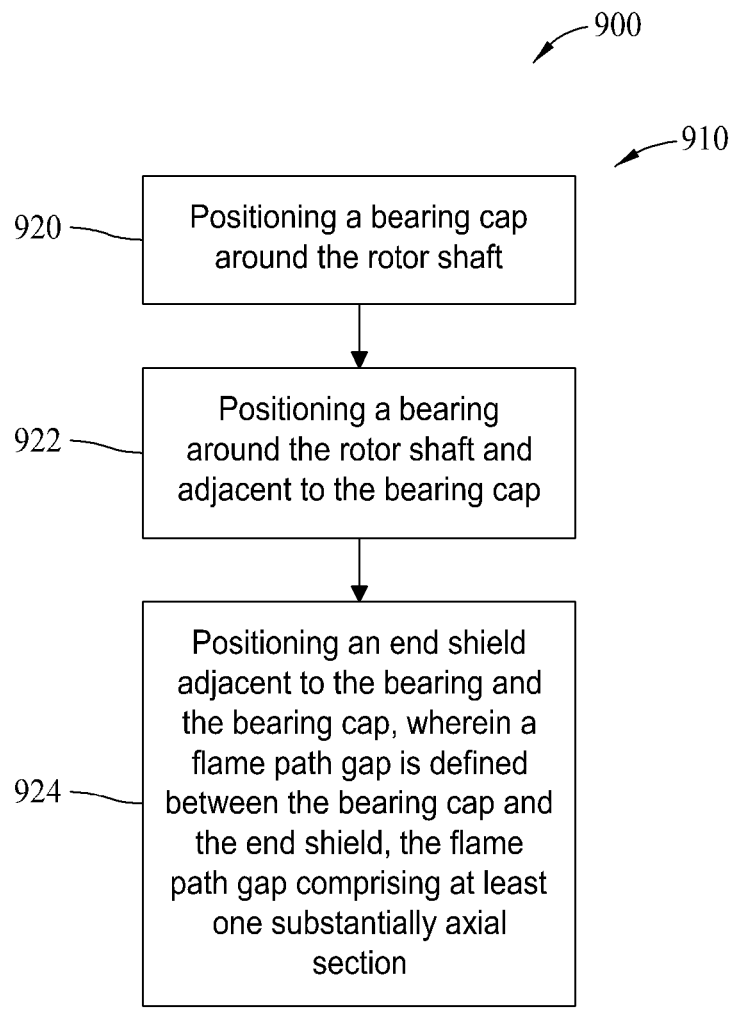
FIG. 10 is a flowchart of an exemplary method for assembling an explosion proof motor.

FIG. 10 is a flowchart 900 of an exemplary method 910 for assembling an explosion proof motor. In the exemplary embodiment, the explosion proof motor assembled using method 910 includes a rotor and a rotor shaft positioned at least partially within an interior of a stator bore. For example, method 910 may be used to assemble motor 300 (shown in FIG. 4), which includes rotor 122 (shown in FIG. 4) and rotor shaft 124 (shown in FIG. 4). Rotor shaft 124 extends axially through a stator bore, for example, stator bore 182 (shown in FIG. 4). In the exemplary embodiment, method 910 includes positioning 920 a bearing cap, for example, bearing cap 336 (shown in FIG. 4), around rotor shaft 124. Method 910 also includes positioning 922 a bearing, for example, bearing 372 (shown in FIG. 4), around rotor shaft 124 and adjacent to bearing cap 336. Method 910 also includes positioning 924 an end shield, for example, end shield 334 (shown in FIG. 4) adjacent to bearing 372 and bearing cap 336. Positioning 924 end shield 334 adjacent to bearing cap 336 includes defining a flame path gap, for example flame path gap 304 (shown in FIG. 4) between bearing cap 336 and end shield 334. In the exemplary embodiment, flame path gap 304 includes at least one substantially axial section, for example, axial section 320 (shown in FIG. 4).

In some embodiments, positioning 924 end shield 334 adjacent to bearing 372 and bearing cap 336 includes securing end shield 334 and bearing cap 336 along rotor shaft 124 to also define at least one substantially radial section, for example, radial section 310 (shown in FIG. 4), of flame path gap 304. In some embodiments, substantially radial section 310 of flame path gap 304 extends substantially radially outward from rotor shaft 124, and substantially axial section 320 of flame path gap 304 extends substantially axially between end shield 334 and a stator bore, for example, stator bore 182 (shown in FIG. 4). In some embodiments, method 910 also includes securing bearing cap 336 to bearing 372. More specifically, including a flame path gap that is fully axially aligned, for example, flame path gap 606 (shown in FIG. 7), facilitates securing a bearing cap to a bearing, for example bearing cap 604 to bearing 372 (shown in FIG. 7), while maintaining flame path gap 606.

The electric motor described above includes a rotor positioned within a stator, and an end shield and an inner bearing cap assembly. The apparatus and methods described herein are not limited to use with a motor, but rather, the end shield and inner bearing cap assembly may be included within any type of rotating device that includes a shaft and a bearing. Furthermore, although substantially linear flame path gaps are described herein, non-linear flame path gaps, or portions of flame path gaps, may also be defined within end shield and inner bearing cap assemblies and function as described herein with respect to the linear flame path gaps. Additionally, combinations of the flame paths described herein may be defined between an end shield and an inner bearing cap and function substantially similarly to the embodiments described herein.

The above-described end shield and inner bearing cap assemblies are reliable and cost-effective. The end shield and inner bearing cap assemblies, and more specifically the flame path gaps defined between the end shields and the inner bearing caps, facilitate use of the largest possible bearing on both ends of the motor by minimizing the diameter of the bearing cap while maintaining a flame path gap length. By way of non-limiting example, an example motor may traditionally use a first bearing on the drive-end and a second, smaller bearing on the opposite-end. The end shield and inner bearing cap assemblies described herein facilitate using the first, larger bearing on both ends of the motor. Including the same sized bearing on both ends of the motor facilitates standardizing the same bearing and bearing cap for both ends of the rotor assembly, increasing bearing life for the opposite-end bearing (larger bearings typically provide greater load capacity), increasing shaft extension diameter capacity for the opposite-end, reducing bearing vibration, and allowing locking of the bearing outer race to the inner bearing cap. As a result, the end shield and inner bearing cap assemblies described herein are part of a cost-effective and reliable motor.

Exemplary embodiments of apparatus and methods for manufacture of a motor are described above in detail. The apparatus and methods are not limited to the specific embodiments described herein, but rather, components of the apparatus and/or steps of the methods may be utilized independently and separately from other components and/or steps described herein. For example, the apparatus and methods are not limited to practice with only the electric motor described herein. Rather, the exemplary embodiment can be implemented and utilized in connection with many other rotary device applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An explosion proof motor comprising a stationary assembly and a rotatable assembly, said stationary assembly comprising a stator defining a stator bore, said rotatable assembly comprising a rotor and a rotor shaft extending substantially axially through said stator bore, said explosion proof motor comprising:
    a frame configured to at least partially surround said stator, said frame defining an interior and an exterior of said motor;
    at least one end shield positioned at an end of said frame, said end shield defining a bearing pocket on an interior side of said end shield for receiving a bearing assembly;
    a bearing cap positioned proximate to the interior side of said end shield and overlying the bearing pocket, at least a portion of said bearing cap spaced apart from said end shield to define a flame path gap between said end shield and said bearing cap, said flame path gap comprising at least one section that extends substantially parallel to said rotor shaft.

2. An explosion proof motor in accordance with claim 1, wherein said flame path gap further comprises at least one section that extends substantially perpendicular to said rotor shaft.

3. An explosion proof motor in accordance with claim 2, wherein at least one of said flame path gap sections is substantially linear.

4. An explosion proof motor in accordance with claim 1 further comprising at least one bearing assembly positioned within the bearing pocket between said end shield and said bearing cap.

5. An explosion proof motor in accordance with claim 4, wherein said bearing cap is positioned directly adjacent to said at least one bearing assembly.

6. An explosion proof motor in accordance with claim 1 further comprising two bearings of equal size positioned at opposite ends of said rotatable assembly.

7. An explosion proof motor in accordance with claim 1, wherein said bearing cap has an outer radius that is less than an inner radius of said stator bore.

8. A method for assembling an explosion proof motor, the explosion proof motor comprising a rotor and a rotor shaft positioned at least partially within an interior of a stator bore, the rotor shaft extending axially through the stator bore, said method comprising;
    positioning a bearing cap around the rotor shaft;
    positioning a bearing around the rotor shaft and proximate to the bearing cap; and
    positioning an end shield proximate to the bearing and the bearing cap, wherein the end shield defines a bearing pocket configured to receive the bearing, and wherein at least a portion of the bearing cap is spaced apart from the end shield to define a flame path gap between the bearing cap and the end shield, the flame path gap comprising at least one section that extends substantially parallel to said rotor shaft.

9. A method in accordance with claim 8, wherein positioning the end shield proximate to the bearing and the bearing cap comprises positioning the end shield proximate to the bearing cap to define a flame path gap further comprising at least one section that extends substantially perpendicular to said rotor shaft.

10. A method in accordance with claim 9, wherein positioning the end shield proximate to the bearing and the bearing cap comprises securing the end shield and the bearing cap in positions along the rotor shaft to define at least one substantially radial section of the flame path gap that extends substantially radially outward from the rotor shaft, and at least one substantially axial section of the flame path gap that extends substantially axially toward the stator bore interior.

11. A method in accordance with claim 8 further comprising positioning the bearing cap directly adjacent to the bearing.

12. An end shield and inner bearing cap assembly for an explosion proof motor, said assembly comprising:
    an end shield, said end shield defining a bearing pocket on an interior side of said end shield for receiving a bearing assembly; and
    an inner bearing cap, said inner bearing cap positioned proximate to the interior side of said end shield and overlying the bearing pocket, said end shield and said inner bearing cap comprising shaft openings extending substantially axially therethrough at least a portion of said inner bearing cap spaced apart from said end shield to define a flame path gap between said end shield and said inner bearing cap, said flame path gap comprising at least one section that extends substantially parallel to said axial shaft openings.

13. An end shield and inner bearing cap assembly in accordance with claim 12, wherein said flame path gap further comprises at least one section that extends substantially perpendicular to said axial shaft openings.

14. An end shield and inner bearing cap assembly in accordance with claim 13, wherein at least one of said flame path gap sections is substantially linear.

15. An end shield and inner bearing cap assembly in accordance with claim 12, said assembly further comprising a bearing assembly positioned within the bearing pocket.

16. An end shield and inner bearing cap assembly in accordance with claim 12, wherein said inner bearing cap has an outer radius that is less than an inner radius of a stator bore of said motor.

* * * * *